Patented May 14, 1935

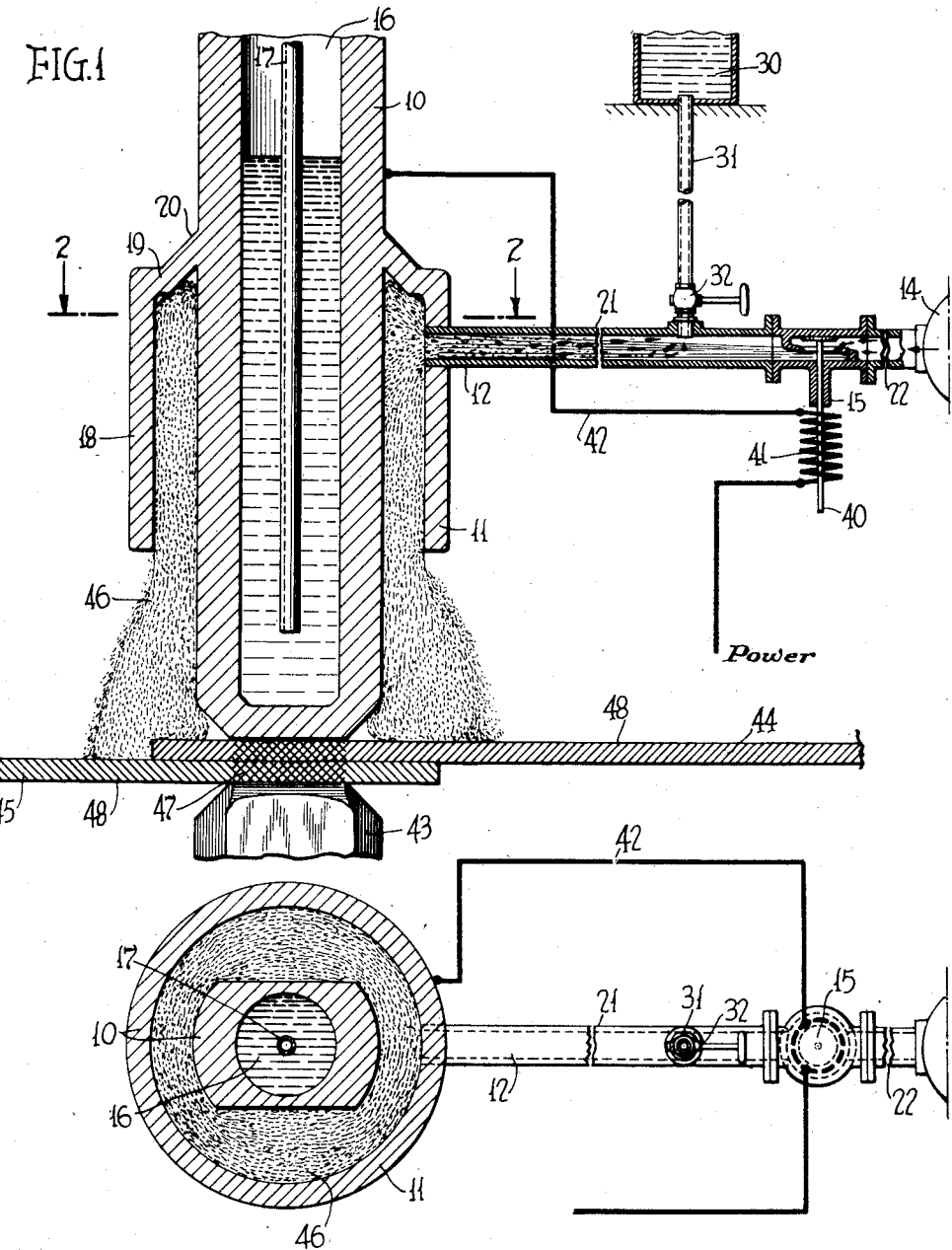

2,001,688

UNITED STATES PATENT OFFICE 2,001,688

METHOD OF WELDING

James J. Paugh, Philadelphia, Pa., assignor to Edward G. Budd Manufacturing Company, Philadelphia, Pa., a corporation of Pennsylvania Application May 28, 1932, Serial No. 614,166

4 Claims. (Cl. 219—4)

My invention relates to electric welding and more particularly to a method and apparatus adapted for use in the welding of galvanized sheet metal parts.

It is a well-known experience in the welding industry to have the welding electrodes become coated with galvanizing material during a welding operation on galvanized sheets resulting in a condition about the electrode surface amounting to substantially a covering of insulating material.

It is my intention to eliminate the difficulties aforementioned and to accomplish other desirable features incidental thereto by means of discharging co-extensively about the welding point of an electrode a blast of air carrying fluid vapor synchronously with the flow of welding current.

I attain the above enumerated and other desirable objects incidental thereto by placing a discharge orifice concentrically about the welding electrode and controlling the discharge of mixed air and liquid therefrom by a means actuated in accordance with the conditions of the welding circuit.

My invention will be better understood from the following description when considered in connection with the accompanying drawing and its scope will be pointed out in the appended claims.

In the accompanying drawing,

Figure 1 is a cross-section elevation of an apparatus embodying my invention, and Figure 2 is a cross-section on line 2—2 through the electrode.

Obviously the figures in the drawing are schematic and are used for purposes of illustration, showing a simple form of construction capable of use in connection with the invention herein disclosed. Some of the parts are enlarged for purposes of more easy apprehension of the device and the complete assembly as illustrated is disproportionate dimensionately commensurately throughout.

The assembly in general comprises an electrode 10 having a discharge member 11 mounted in concentric relation to the electrodes and receiving at some point a conduit or pipe line 12 connected with a suitable water supply 30 and an air supply 14. Interposed in the pipe line 12 and suitably positioned with respect to the air and water supply is an electro-magnetically-operated valve 15 connected with the main power supply going to the electrode and thereby adapted for synchronous operation with the flow of welding current, in such a manner that the blast or jet of water-saturated air is discharged substantially adjacent the welding electrode during the welding operation and at other times the air blast is shut off thereby conserving power and not interfering with the operation of the parts during the relative approach and retrograde movements with respect to the work pieces.

The electrode 10 is substantially hollow, as shown at 16, and having positioned substantially centrally thereof a water supply pipe 17 adapted to convey cool water into the electrode. The heated water flows upwardly about the inlet pipe passing to any suitable apparatus for its reception. The orifice 11 comprises a suitable cylindrical portion 18 concentrically mounted and spaced externally of the electrode and fastened thereto by means of a shoulder 19 and any form of connection suitable to the exigencies of the composition of the parts. The conduit 12 enters this skirt or cylindrical member 18 and is broken at several points 21 and 22 thereby being adapted for flexible connection or any other connections suitable for the adjacent supporting parts of a machine or device using the same.

A water supply 30 is mounted in convenient relation to the conduit and is connected thereto by means of a pipe 31 and a valve 32. This valve 32 is constructed of such form that the amount of water allowed to drop into the pipe line 12 is commensurate with the amount of air so that the said globules of water are atomized or broken up thereby properly saturating the jet of air from the valve 15. The valve 15 although shown open in Fig. 1, is of the normally closed type having a plunger 40 connected to the valve member per se and mounted in operative association with the solenoid 41 which is associated with the power supply line 42. The opposite side of the power is connected with the electrode 43 positioned below the two work members 44 and 45.

The operation of my device is as follows: After the welding electrodes 43 and 10 have been relatively approached with respect to the work parts 44 and 45 overlapping intermediate the electrode points, a suitable pressure is obtained, then the welding current is turned on by a proper timing mechanism associated with the apparatus. The flow of welding current functions to actuate the solenoid and valve mechanism 40 and 41 thereby opening the air supply from the reservoir 14 into the conduit 12. The compressed gas passes the fluid inlet in the form of a jet and a Venturi type of opening may be placed in the line substantially adjacent the water inlet to more evenly or more satisfactorily break up the globules of water though this latter expedient is optional. The fluid is broken up into very minute particles, saturating or moistening the gas supply so that a cloud of mixed gas and vapor 46 is discharged about the electrode adjacent the point of contact with the work. This cloud of cold-saturated air cools the electrode and likewise acts to cool the work parts adjacent the point of welding. The moisture passes away from the parts in the form of steam after having received a substantial portion of the B. t. u. content of the work parts and electrode adjacent the welding. This procedure continues until the duration of welding has ceased at which time a weld has occurred at the point 47, the blast ceases and the electrodes are saturated. The actuation of the device continues in this manner at each spot weld and the galvanizing material upon the surfaces 48 of the sheet metal members is retained thereupon and does not stick to the surface of the electrode, forming a substantially insulating oxide thereupon.

The embodiment of the invention illustrated and described herein has been selected for the purpose of clearly setting forth the principles involved. It is apparent that the invention is susceptible of being modified to meet different conditions encountered in its use and I therefore aim to cover by the appended claims all modifications within the true spirit and scope of the invention.

What I claim is:

1. The method of cooling a spot welding electrode which comprises continuously circulating a cooling medium interiorly of the electrode and discharging a blast of air containing vaporized or atomized water about the electrode welding point synchronously with the passage of the welding current.

2. A spot welding combination comprising a hollow water-cooled spot welding electrode, a cylindrical discharge orifice concentric therewith, a water supply means, a compressed air supply, means connecting said orifice to said water and said air supply means, and an electro-magnetic valve controlling the discharge from said orifice synchronously with the flow of welding current.

3. The combination of a spot welding electrode and cooling means including an orifice arranged to discharge a blast of air containing vaporized fluid toward the electrode point and means to release said blast in synchronism with the flow of welding current.

4. The combination of a spot welding electrode and cooling means including an orifice arranged to discharge a jet of a cooling fluid toward the electrode, and means arranged to release said jet in synchronism with the flow of welding current.

JAMES J. PAUGH.